US008264116B2

(12) United States Patent
Zahora et al.

(10) Patent No.: US 8,264,116 B2
(45) Date of Patent: Sep. 11, 2012

(54) MOTOR/GENERATOR PHASE INSULATION ARTICLE AND METHOD FOR MANUFACTURING

(75) Inventors: Joseph A. Zahora, Kettering, OH (US); Ralph M. Gutman, Centerville, OH (US); Bryan E. Ladd, West Carrollton, OH (US)

(73) Assignee: Dayton-Phoenix Group, Inc., Dayton, OH (US)

( * ) Notice: Subject to any disclaimer, the term of this patent is extended or adjusted under 35 U.S.C. 154(b) by 872 days.

(21) Appl. No.: 12/255,880

(22) Filed: Oct. 22, 2008

(65) Prior Publication Data
US 2010/0019611 A1 Jan. 28, 2010

Related U.S. Application Data

(60) Provisional application No. 61/082,531, filed on Jul. 22, 2008.

(51) Int. Cl.
*H02K 3/34* (2006.01)
(52) U.S. Cl. .............. 310/215; 29/596; 29/597; 29/598
(58) Field of Classification Search .................. 310/215; 29/596–598
See application file for complete search history.

(56) References Cited

U.S. PATENT DOCUMENTS

| | | | |
|---|---|---|---|
| 2,435,093 A | 1/1948 | Mitschrich | |
| 2,455,862 A | 12/1948 | Goldberg | |
| 2,703,854 A | 3/1955 | Eisler | |
| 2,858,514 A | 10/1958 | Henderson et al. | |
| 3,009,010 A | 11/1961 | Stearns et al. | |
| 3,637,452 A | 1/1972 | Sanders | |
| 4,639,977 A | 2/1987 | Howard | |
| 5,093,543 A * | 3/1992 | Patton et al. | 174/138 E |
| 5,642,013 A | 6/1997 | Wavre | |
| 5,910,691 A | 6/1999 | Wavre | |
| 5,989,684 A | 11/1999 | Hazelton et al. | |
| 6,660,940 B1 | 12/2003 | Emery | |
| 6,711,863 B2 | 3/2004 | Cunningham et al. | |
| 6,891,285 B2 | 5/2005 | Harned et al. | |
| 6,919,654 B2 | 7/2005 | Harned et al. | |

FOREIGN PATENT DOCUMENTS

| | | | |
|---|---|---|---|
| AU | 260758 | | 2/1962 |
| JP | 2003319594 A | * | 11/2003 |
| SU | 424242 | | 8/1974 |

OTHER PUBLICATIONS

JP 2003319594 Machine translation on Mar. 7, 2012.*

\* cited by examiner

*Primary Examiner* — Quyen Leung
*Assistant Examiner* — Leda Pham
(74) *Attorney, Agent, or Firm* — Thompson Hine L.L.P.

(57) ABSTRACT

Apparatus including a monolithic, motor/generator phase insulation article having a manufactured state and a ready-to-use state. The insulation article has longitudinally-spaced-apart first and second tabs and flexible, transversely-spaced-apart first and second legs each having a first end monolithically joined to the first tab and a second end monolithically joined to the second tab. The first and second tabs are disposed longitudinally closer together in the manufactured state than in the ready-to-use state. In the manufactured state the first and second legs each have a more serpentine shape, and in the ready-to-use state the first and second legs each have a less serpentine shape. A method for manufacturing the insulation article is also described which cuts a monolithic, substantially-rectangular sheet of motor/generator phase insulation to create the insulation article.

13 Claims, 5 Drawing Sheets

MOTOR/GENERATOR PHASE INSULATION ARTICLE AND METHOD FOR MANUFACTURING

CROSS REFERENCE TO RELATED APPLICATIONS

The present application claims priority of U.S. Provisional Application No. 61/082,531 filed Jul. 22, 2008.

TECHNICAL FIELD

The present invention relates generally to single or multi-phase electric motors and generators, and more particularly to a motor/generator phase insulation article and to a method for manufacturing a motor/generator phase insulation article.

BACKGROUND OF THE INVENTION

Conventional multi-phase electric motors include those having stator slots for phase coils and having monolithic, motor phase insulation articles each providing electrical insulation between corresponding adjacent phase coils at the two ends of the stator. In use, the thin motor phase insulation article has two tabs each positioned proximate a corresponding end of the stator between two sets of different phase coils. The two tabs are monolithically joined together by at least two legs each positioned in a corresponding one of the stator slots. The at-least-two legs monolithically hold the tabs together so the tabs do not fall off the stator or misalign during or after motor assembly.

A conventional method for manufacturing a motor phase insulation article includes obtaining a sheet of insulation, such as a rectangular sheet of Nomex® electrical insulation available from DuPont Corporation. The sheet is cut to remove material between adjacent legs and material outward from the outer two legs. It is noted that the insulation article is also known as an "H" paper insulator divider which provides a dielectric to separate stator windings.

Another conventional method for manufacturing a motor phase insulation article is disclosed in U.S. Pat. No. 5,093,543 whose FIG. 5 shows how an uninstalled motor phase insulation article is to be installed with its two legs each positioned in a corresponding stator slot of a multi-phase motor and which shows several installed motor phase insulation articles. In U.S. Pat. No. 5,093,543, the manufacturing method starts with a monolithic, non-rectangular, special-shaped sheet of insulation which includes steps along two of its eight edges and which includes two monolithically-abutting tabs. Three slits are then cut in the sheet of insulation to form the two legs and allow the tabs to be pulled apart for the motor phase insulation article to be ready to use.

What is needed is an improved motor/generator phase insulation article and an improved method for manufacturing a motor/generator phase insulation article.

SUMMARY OF THE INVENTION

An expression of an embodiment of the invention is for apparatus including a monolithic, motor/generator phase insulation article having a manufactured state and a ready-to-use state. The insulation article has a central longitudinal axis, has longitudinally-spaced-apart first and second tabs, and has flexible, transversely-spaced-apart first and second legs. The first and second legs each have a first end monolithically joined to the first tab and a second end monolithically joined to the second tab. The first and second tabs are positioned longitudinally closer together in the manufactured state than in the ready-to-use state. In the manufactured state the first and second legs each have a more serpentine shape, and in the ready-to-use state, the first and second legs each have a less serpentine shape.

A method of the invention is for manufacturing a motor/generator phase insulation article and includes steps a) and b). Step a) includes obtaining a monolithic, substantially-rectangular sheet of motor/generator phase insulation. Step b) includes cutting the sheet to remove material from the sheet, wherein the cut sheet has: (1) a central longitudinal axis; (2) longitudinally-spaced-apart first and second tabs; and (3) flexible, transversely-spaced-apart first and second legs each having a first end monolithically joined to the first tab and a second end monolithically joined to the second tab, wherein the first and second legs each have a serpentine shape.

Several benefits and advantages are derived from the expression of an embodiment and/or the method of the invention. In one example, a motor/generator phase insulation article is cut from a rectangular sheet of motor/generator phase insulation with a reduced amount of sheet wastage. In the same or a different example, the first and second legs of the manufactured motor/generator phase insulation article can be extended from a more serpentine manufactured state to a less serpentine, longitudinally extended shape for a first ready-to-use state for a first electric motor having a shorter stator stack length and can be further extended to an even less serpentine, more longitudinally extended shape for a second ready-to-use state for a second electric motor having a longer stator stack length.

DETAILED DESCRIPTION

Figure 1:
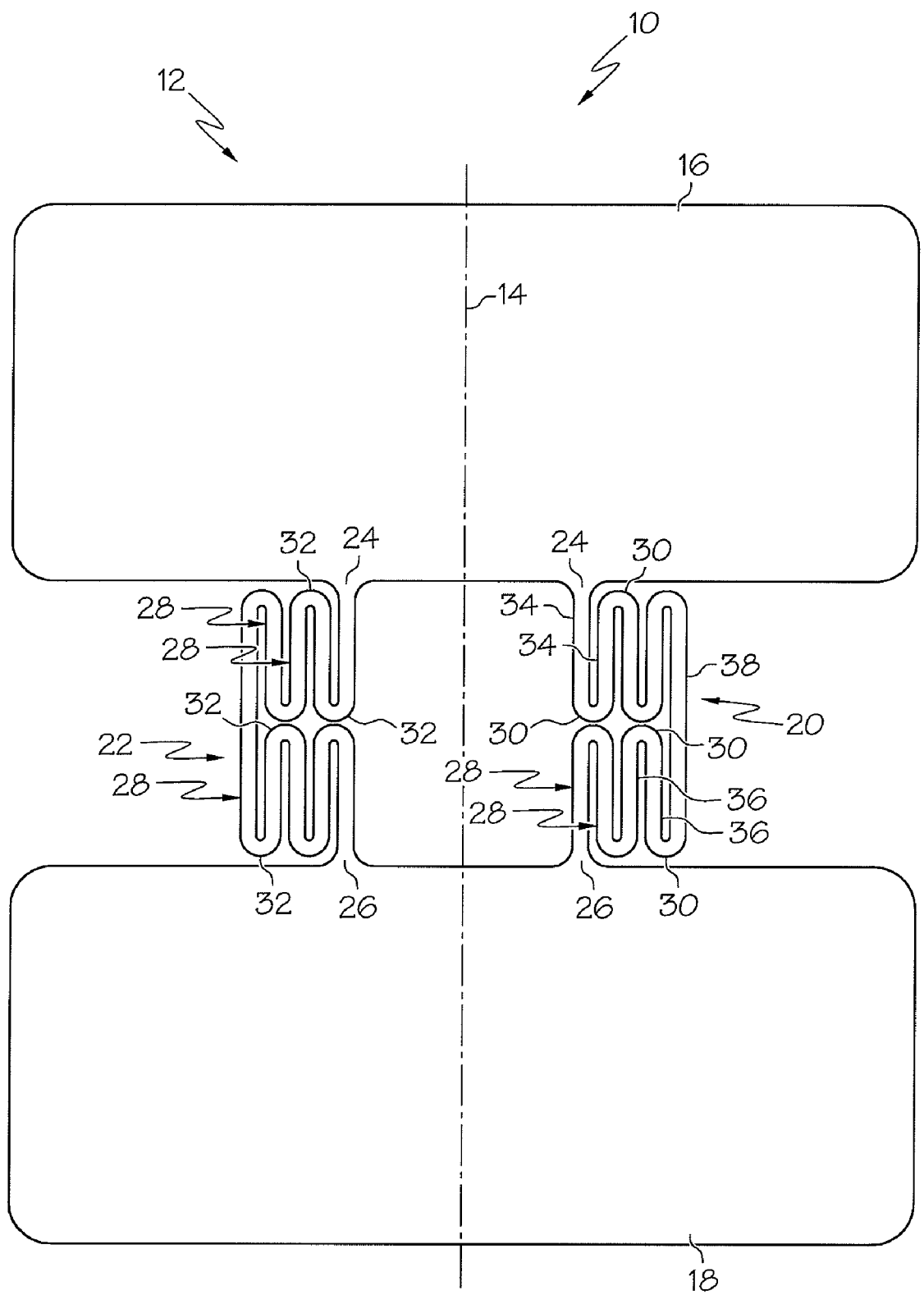
FIG. 1 is a top planar view of an embodiment of the motor/generator phase insulation article of the invention in a manufactured state.
Figure 2:
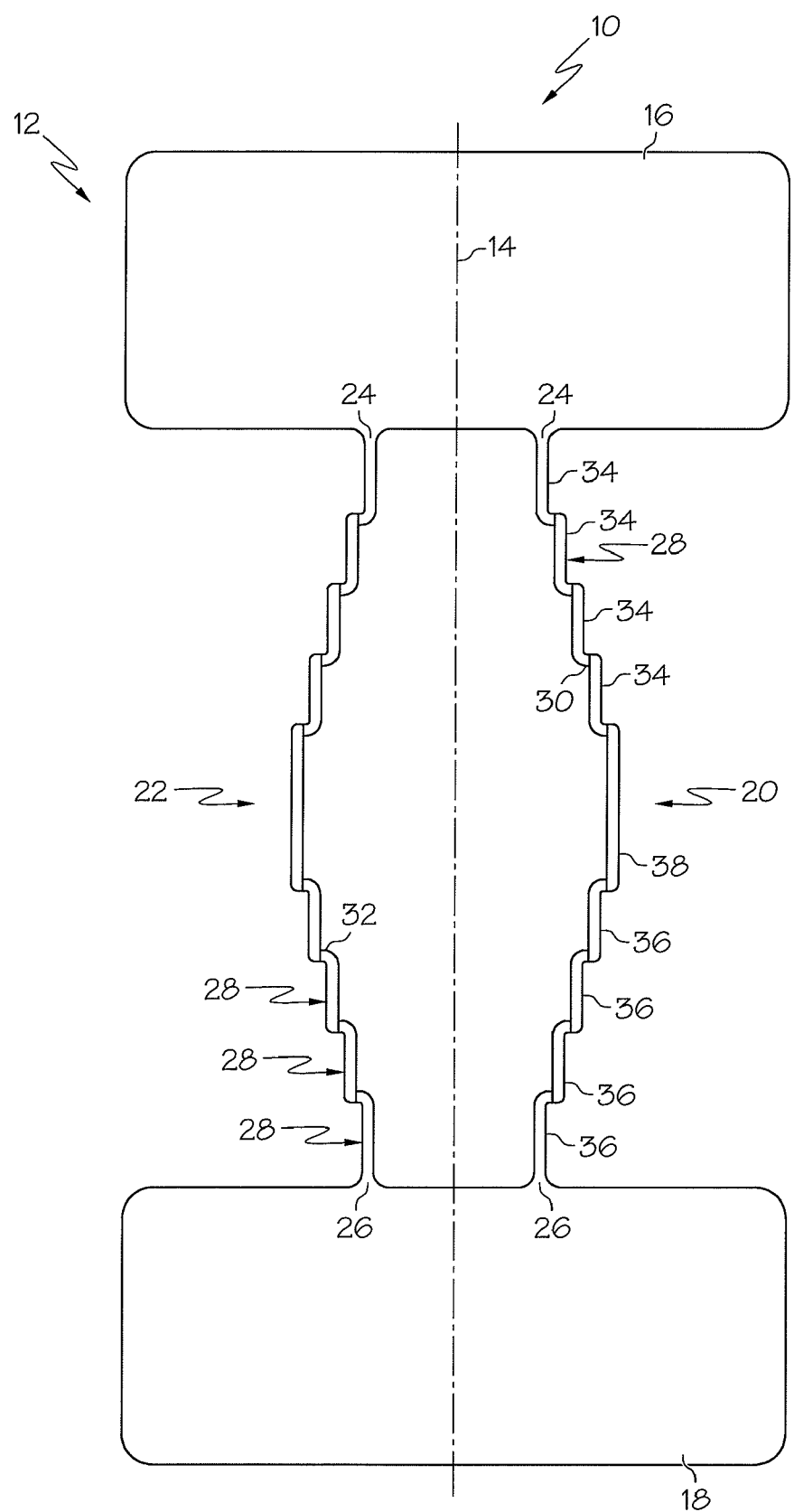
FIG. 2 is a top planar view of the insulation article of FIG. 1 in a ready-to-use state of maximum tab longitudinal separation.

Referring now to the drawings, FIGS. 1-2 show an embodiment of the present invention. A first expression of the embodiment of FIGS. 1-2 is for apparatus 10 including a monolithic, motor/generator phase insulation article 12 having a manufactured state (as shown in FIG. 1) and a ready-to-use state (an example of which is shown in FIG. 2). The insulation article 12 has a central longitudinal axis 14, has longitudinally-spaced-apart first and second tabs 16 and 18, and has flexible, transversely-spaced-apart first and second legs 20 and 22. The first and second legs 20 and 22 each have a first end 24 monolithically joined to the first tab 16 and a second end 26 monolithically joined to the second tab 18. The first and second tabs 16 and 18 are positioned longitudinally closer together in the manufactured state (as shown in FIG. 1) than in the ready-to-use state (an example of which is shown in FIG. 2). In the manufactured state the first and second legs 20 and 22 each have a more serpentine shape, and in the ready-to-use state the first and second legs 20 and 22 each have a less serpentine shape.

As seen from FIGS. 1-2, the first and second tabs 16 and 18 are spaced longitudinally further apart in the ready-to-use state than in the manufactured state. It is noted that the central longitudinal axis 14 is defined as an axis which passes through the center of one of the tabs 16 and 18, which extends to the other of the tabs 16 and 18, and which would pass through the center of the other tab if the other tab was identical in size and shape to the one tab. It is further noted that the central longitudinal axis 14 has been defined regardless of the width of the tabs 16 and 18 in relation to their spaced-apart longitudinal distance in the manufactured state and/or in the ready-to-use state.

In a first application, the insulation article 12 is a motor phase insulation article for a multi-phase or a single-phase electric motor, and in one employment, the legs 20 and 22 in the ready-to-use state are each disposed in a corresponding stator slot of the motor stator with the tabs 16 and 18 each extending beyond a corresponding stator end. In one variation the motor stator surrounds the motor rotor, and in another variation the motor rotor surrounds the motor stator. In a second application, the insulation article 12 is a generator phase insulation article for a multi-phase or a single-phase electric generator, and in one employment, the legs 20 and 22 in the ready-to-use state are each disposed in a corresponding stator slot of the generator stator with the tabs 16 and 18 each extending beyond a corresponding stator end. In one variation the generator stator surrounds the generator armature, and in another variation the generator armature surrounds the generator stator. In one choice of material, the insulation article 12 consists essentially of Nomex® electrical insulation available from DuPont Corporation. Other choices of material are left to those skilled in the art.

In one enablement of the first expression of the embodiment of FIGS. 1-2, the first and second tabs 16 and 18 each are substantially bisected by the central longitudinal axis 14, and the central longitudinal axis 14 is disposed substantially transversely-midway between the first and second legs 20 and 22. In one extension of the first expression of the embodiment of FIGS. 1-2, the insulation article 12 includes at least one additional, flexible leg (not shown) monolithically connecting the first and second tabs 16 and 18, having a more serpentine shape in the manufactured state, and having a less serpentine shape in the ready-to-use state. In one variation, in the manufactured state the first and second tabs 16 and 18 and the first and second legs 20 and 22 lie substantially in a common plane. In one modification, the first and second tabs 16 and 18 are flexible.

In one implementation of the first expression of the embodiment of FIGS. 1-2, in the manufactured state the first and second legs 20 and 22 each have a plurality of substantially straight and substantially longitudinally-aligned leg segments 28. In one variation, in the manufactured state the first leg 20 has a plurality of first leg turns 30, the second leg 22 has a plurality of second leg turns 32, the leg segments 28 of the first leg 20 are monolithically joined together in serial-flow relationship by the first leg turns 30, and the leg segments 28 of the second leg 22 are monolithically joined together in serial-flow relationship by the second leg turns 32. It is noted that the leg turns 30 and 32 may be curved (as shown in FIG. 1) or straight. In one modification, in the manufactured state the leg segments 28 of the first leg 20 include a multiplicity of upper leg segments 34 extending from proximate the first tab 16 to proximate longitudinally-midway to the second tab 18, a multiplicity of lower leg segments 36 extending from proximate the second tab 18 to proximate longitudinally-midway to the first tab 16, and a connecting leg segment 38 extending from proximate the first tab 16 to proximate the second tab 18. It is noted that the term "proximate" includes, but is not limited to, "at". In one arrangement, the connecting leg segment 38 is disposed transversely outward from the upper and lower leg segments 34 and 36. In one illustration, in the ready-to-use state at least one leg segment 28 of the first leg 20 is bent over or under a monolithically-joining first leg turn 30 to increase the longitudinal extent of the first leg 20.

In one construction, in the manufactured state the second leg 22 is a substantially mirror image of the first leg 20 about the central longitudinal axis 14. In one variation, in the manufactured state the second tab 18 is a substantially mirror image of the first tab 16 about the central longitudinal axis 14. In one example, such mirror images also exist in the ready-to-use state.

Figure 3:
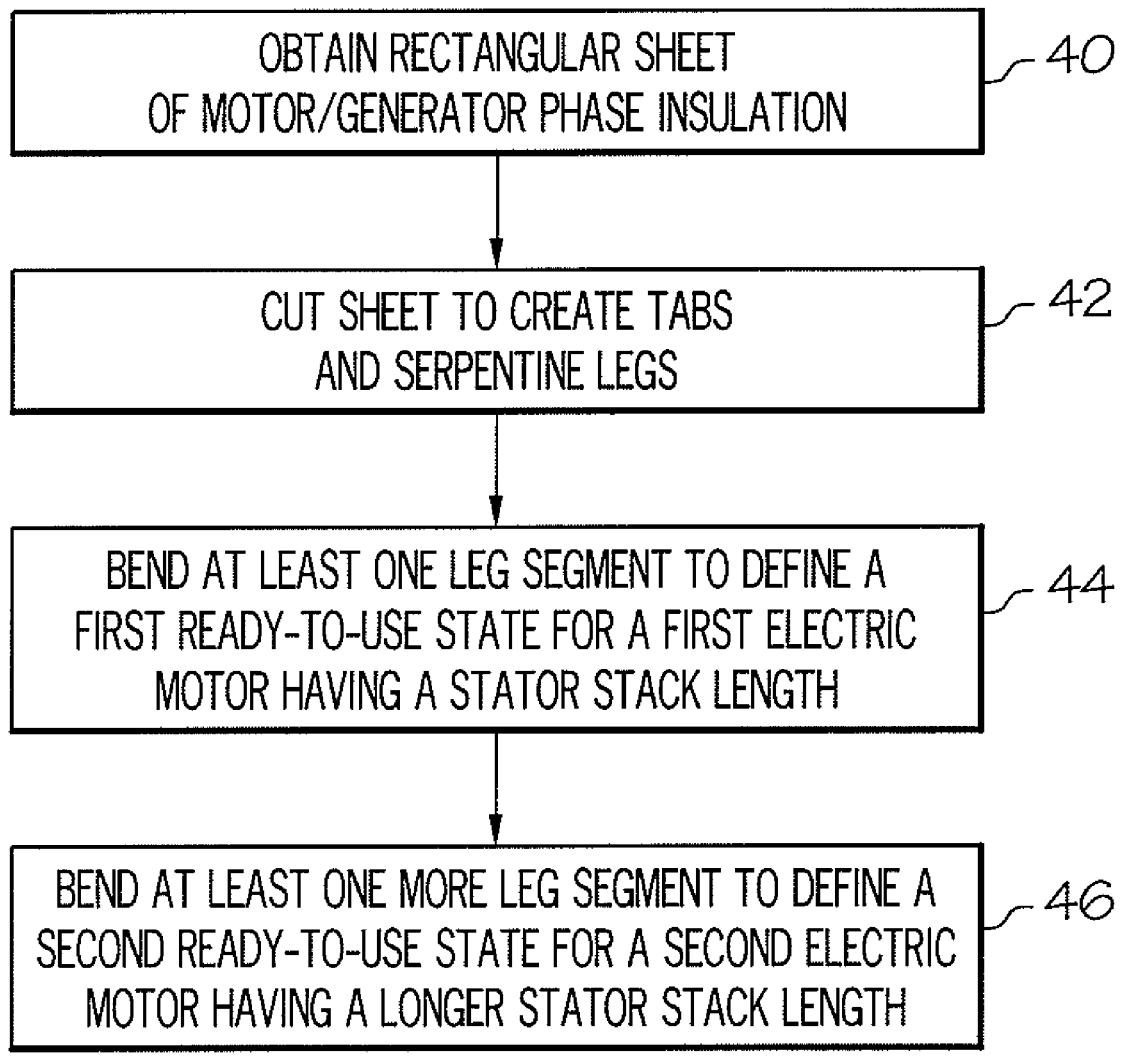
FIG. 3 is a flow chart of a method of the invention for manufacturing the insulation article of FIG. 1, wherein the flow chart also includes two steps for also preparing the manufactured insulation article for use.

A method of the invention is for manufacturing a motor/generator phase insulation article 12 and includes steps a) and b). Step a) is labeled in block 40 of FIG. 3 as "Obtain Rectangular Sheet Of Motor/Generator Phase Insulation". Step a) includes obtaining a monolithic, substantially-rectangular sheet of motor/generator phase insulation. Step b) is labeled in block 42 of FIG. 3 as "Cut Sheet To Create Tabs And Legs". Step b) includes cutting the sheet to remove material from the sheet, wherein the cut sheet has: (1) a central longitudinal axis; (2) longitudinally-spaced-apart first and second tabs; and (3) flexible, transversely-spaced-apart first and second legs each having a first end monolithically joined to the first tab and a second end monolithically joined to the second tab, wherein the first and second legs each have a serpentine shape.

In one employment of the method, the sheet is placed between top and bottom cutting dies, and the top and bottom cutting dies are brought into engagement to cut the sheet to create the insulation article 12. Other employments of the method, including the use of a laser cutting machine, are left to the artisan. In one example, the sheet is 8.25 inches long, 7.00 inches wide, and 0.007 inches thick. In this example, the cut sheet would create a manufactured insulation article 12 (such as that shown in FIG. 1) having identical first and second tabs 16 and 18 which are spaced 2.248 inches apart with each tab being 7.000 inches wide and 3.000 inches long (with length measured along the central longitudinal axis 14) and having mirror image first and second legs 20 and 22 transversely spaced 1.750 inches apart with each leg having nine leg segments 28 each 0.125 inches wide. In the ready-to-use state of greatest longitudinal separation of the first and second tabs 16 and 18, the first and second tabs would be substantially 9 inches apart.

In one enablement of the method, step b) cuts the sheet with the first and second tabs 16 and 18 each substantially bisected by the central longitudinal axis 14 and with the central longitudinal axis 14 disposed substantially transversely-midway between the first and second legs 20 and 22. In one variation, step b) cuts the sheet with the first and second tabs 16 and 18 and the first and second legs 20 and 22 lying substantially in a common plane.

In one implementation of the method, step b) cuts the sheet with the first and second legs 20 and 22 each having a plurality of substantially straight and substantially longitudinally-aligned leg segments 28. In one variation, step b) cuts the sheet with the first leg 20 having a plurality of first leg turns 30, with the second leg 22 having a plurality of second leg turns 32, with the leg segments 28 of the first leg 20 monolithically joined together in serial-flow relationship by the first leg turns 30, and with the leg segments 28 of the second leg 22 monolithically joined together in serial-flow relationship by the second leg turns 32. In one modification, step b) cuts the sheet with the leg segments 28 of the first leg 20 including a multiplicity of upper leg segments 34 extending from proximate the first tab 16 to proximate longitudinally-midway to the second tab 18, a multiplicity of lower leg segments 36 extending from proximate the second tab 18 to proximate longitudinally-midway to the first tab 16, and a connecting leg segment 38 extending from proximate the first tab 16 to proximate the second tab 18. In one arrangement, step b) cuts the sheet with the connecting leg segment 38 disposed transversely outward from the upper and lower leg segments 34 and 36.

In one extension, the method is also for preparing the manufactured motor/generator phase insulation article 12 for use, and also includes step c). Step c) is labeled in block 44 of FIG. 3 as "Bend At Least One Leg Segment To Define A First Ready-To-Use State For a First Electric Motor Having A First Stator Stack Length". Step c) includes bending at least one leg segment 28 of the first leg 20 over or under a monolithically-joining first leg turn 30 to increase the longitudinal extent of the first leg 20 and partially define a first ready-to-use state of the motor/generator phase insulation article 12 for a first electric motor/generator having a first stator stack length. In a further extension, the method also includes step d). Step d) is labeled in block 46 of FIG. 3 as "Bend At Least One More Leg Segment To Define A Second Ready-To-Use State For a Second Electric Motor Having A Second Stator Stack Length". Step d) includes bending at least one more leg segment 28 of the first leg 20 over or under a monolithically-joining first leg turn 30 to further increase the longitudinal extent of the first leg 20 and partially define a second ready-to-use state for a second electric motor/generator having a second stator stack length which is greater than the first stator stack length of the first electric motor/generator.

In one enactment of the method, step b) cuts the sheet with the second leg 22 a substantially mirror image of the first leg 20 about the central longitudinal axis 14. In one variation, step b) cuts the sheet with the second tab 18 a substantially mirror image of the first tab 16 about the central longitudinal axis 14.

Figure 4:
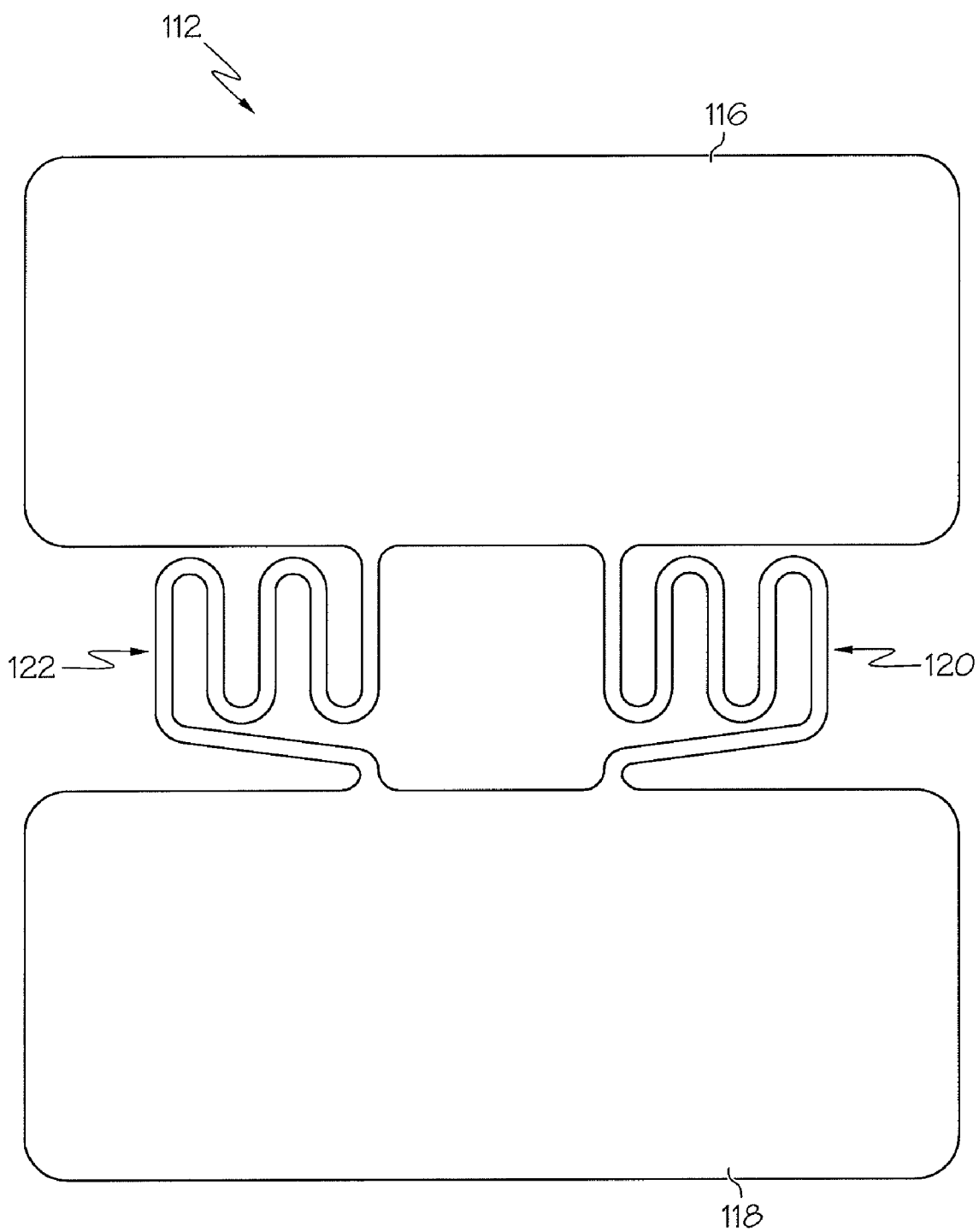
FIG. 4 is a view, as in FIG. 1, but of a first alternate embodiment of an insulation article of the invention.

FIG. 4 shows a first alternate embodiment of a motor/generator phase insulation article 112 of the invention, wherein the first and second legs 120 and 122 each are monolithically joined to the first and second tabs 116 and 118. In this embodiment, the first and second legs 120 and 122 each transversely-outwardly flow in a serpentine manner but transversely-inwardly return in a non-serpentine manner whereas, in the embodiment of FIG. 1, the first and second legs 20 and 22 each transversely-outwardly flow and transversely-inwardly return in a serpentine manner. It is noted that the previous description given in paragraph [0015] of the first expression of the embodiment of FIGS. 1-2 also describes the first alternate embodiment of the insulation article 112 of FIG. 4.

Figure 5:
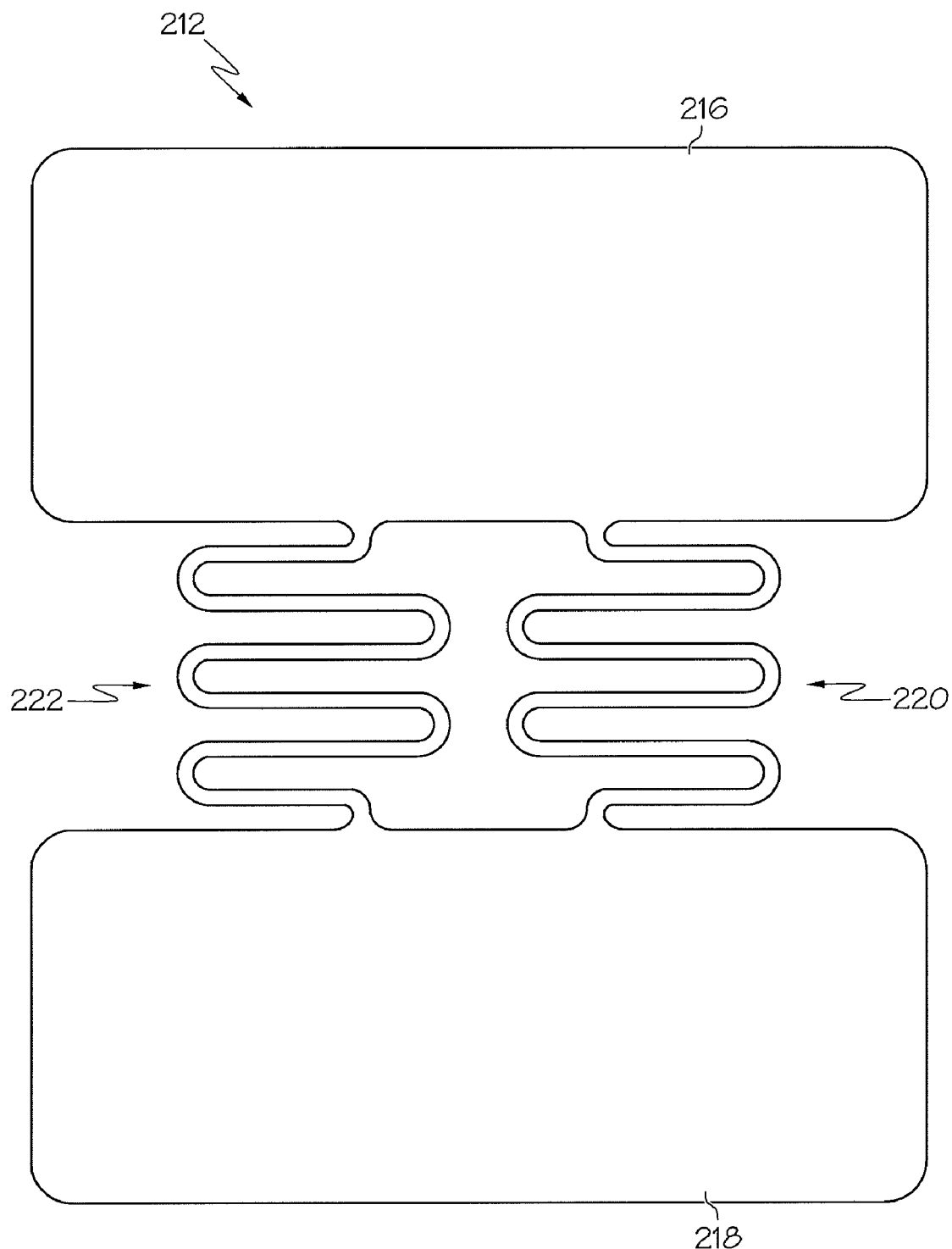
FIG. 5 is a view, as in FIG. 1, but of a second alternate embodiment of an insulation article of the invention.

FIG. 5 shows a second alternate embodiment of a motor/generator phase insulation article 212 of the invention, wherein the first and second legs 220 and 222 each are monolithically joined to the first and second tabs 216 and 218. In this embodiment, the first and second legs 220 and 222 each longitudinally flow in a serpentine manner whereas, in the embodiment of FIG. 1, the first and second legs 20 and 22 transversely flow in a serpentine manner. It is noted that the previous description given in paragraph [0015] of the first expression of the embodiment of FIGS. 1-2 also describes the second alternate embodiment of the insulation article 212 of FIG. 5. Other alternate embodiments are left to those skilled in the art.

Several benefits and advantages are derived from the expression of an embodiment and/or the method of the invention. In one example, a motor/generator phase insulation article is cut from a rectangular sheet of motor/generator phase insulation with a reduced amount of sheet wastage. In the same or a different example, the first and second legs of the manufactured motor/generator phase insulation article can be extended from a more serpentine manufactured state to a less serpentine, longitudinally extended shape for a first ready-to-use state for a first electric motor having a shorter stator stack length and can be further extended to an even less serpentine, more longitudinally extended shape for a second ready-to-use state for a second electric motor having a longer stator stack length.

The foregoing description of an expression of an embodiment and a method of the invention has been presented for purposes of illustration. It is not intended to be exhaustive or to limit the invention to the precise form and steps disclosed, and obviously many modifications and variations are possible in light of the above teaching. It is intended that the scope of the invention be defined by the claims appended hereto.

The invention claimed is:

1. A monolithic, motor/generator phase insulation article having a manufactured state and a ready-to-use state, comprising:
    a central longitudinal axis,
    longitudinally spaced-apart first and second tabs,
    flexible, transversely spaced-apart first and second legs each having a first end monolithically joined to the first tab and a second end monolithically joined to the second tab,
    wherein the first and second tabs are disposed longitudinally closer together in the manufactured state than in the ready-to-use state,
    wherein, in the manufactured state, the first and second legs each have a more serpentine shape, and in the ready-to-use state, the first and second legs each have a less serpentine shape,
    wherein, in the manufactured state, the first and second legs each have a multiplicity of substantially straight and substantially longitudinally-aligned upper leg segments extending from proximate the first tab to proximate longitudinally-midway to the second tab, a multiplicity of substantially straight and substantially longitudinally-aligned lower leg segments extending from proximate the second tab to proximate longitudinally-midway of the first tab, and a connecting leg segment extending from proximate the first tab to proximate the second tab, and the first leg has a plurality of first leg turns, the second leg has a plurality of second leg turns, and the leg segments of the first leg are monolithically joined together in serial-flow relationship by the first leg turns, and the leg segments of the second leg are monolithically joined together in serial-flow relationship by the second leg turns.

2. The apparatus of claim 1, wherein the first and second tabs each are substantially bisected by the central longitudinal axis, and wherein the central longitudinal axis is disposed substantially transversely-midway between the first and second legs.

3. The apparatus of claim 2, wherein, in the manufactured state, the first and second tabs and the first and second legs lie substantially in a common plane.

4. The apparatus of claim 1, wherein the connecting leg segment is disposed transversely outward from the upper and lower leg segments.

5. The apparatus of claim 4, wherein, in the ready-to-use state, at least one leg segment of the first leg is bent over or under a monolithically joining first leg turn to increase the longitudinal extent of the first leg.

6. The apparatus of claim 1, wherein, in the manufactured state, the second leg is a substantially mirror image of the first leg about the central longitudinal axis.

7. The apparatus of claim 6, wherein, in the manufactured state, the second tab is a substantially mirror image of the first tab about the central longitudinal axis.

8. A method for manufacturing a motor/generator phase insulation article comprising:
   a) obtaining a monolithic, substantially-rectangular sheet of motor/generator phase insulation; and
   b) cutting the sheet to remove material from the sheet, wherein the cut sheet has:
      (1) a central longitudinal axis,
      (2) longitudinally spaced-apart first and second tabs, and
      (3) flexible, transversely spaced-apart first and second legs each having a first end monolithically joined to the first tab and a second end monolithically joined to the second tab, wherein each of the first and second legs has a serpentine shape, a plurality of substantially straight and substantially longitudinally-aligned leg segments, and wherein the leg segments of the first leg include a multiplicity of upper leg segments extending from proximate the first tab to proximate longitudinally-midway to the second tab, a multiplicity of lower leg segments extending from proximate the second tab to proximate longitudinally-midway to the first tab, and a connecting leg segment extending from proximate the first tab to proximate the second tab, and
   the first leg having a plurality of first leg turns and the second leg having a plurality of second leg turns, with the leg segments of the first leg monolithically joined together in serial-flow relationship by the first leg turns, and with the leg segments of the second leg monolithically joined together in serial-flow relationship by the second leg turns.

9. The method of claim 8, wherein step b) cuts the sheet with the connecting leg segment disposed transversely outward from the upper and lower leg segments.

10. The method of claim 8, also for preparing the manufactured motor/generator phase insulation article for use, and further comprising:
   c) bending at least one leg segment of the first leg over or under a monolithically joining first leg turn to increase the longitudinal extent of the first leg and partially define a first ready-to-use state of the motor/generator phase insulation article for a first electric motor/generator having a first stator stack length.

11. The method of claim 10, further comprising:
   d) bending at least one more leg segment of the first leg over or under a monolithically-joining first leg turn to further increase the longitudinal extent of the first leg and partially define a second ready-to-use state for a second electric motor/generator having a second stator stack length which is greater than the first stator stack length of the first electric motor/generator.

12. The method of claim 8, wherein step b) cuts the sheet with the second leg a substantially mirror image of the first leg about the central longitudinal axis and with the second tab a substantially mirror image of the first tab about the central longitudinal axis.

13. A monolithic, motor/generator phase insulation article having a manufactured state and a ready-to-use state, comprising:
   spaced-apart first and second tabs, wherein the first and second tabs are disposed closer together in the manufactured state than in the ready-to-use state, and
   flexible, transversely spaced-apart first and second legs each having a first end monolithically joined to the first tab and a second end monolithically joined to the second tab, and in the manufactured state, each of the first and second legs includes serpentine component formed by a plurality of substantially elongate segments interconnected by a plurality of leg turns and when in the ready-to-use state, each of the serpentine components of the first and second legs has a less serpentine shape; and
   wherein, in the manufactured state, at least one of the first and second legs has a multiplicity of substantially straight and substantially longitudinally-aligned upper leg segments extending from proximate the first tab to proximate longitudinally-midway to the second tab, a multiplicity of substantially straight and substantially longitudinally-aligned lower leg segments extending from proximate the second tab to proximate longitudinally-midway of the first tab, and a connecting leg segment extending from proximate the first tab to proximate the second tab, and the first and second legs have a plurality of leg turns, and the leg segments of the first and second legs are monolithically joined together in serial-flow relationship by the leg turns.

* * * * *